United States Patent Office.

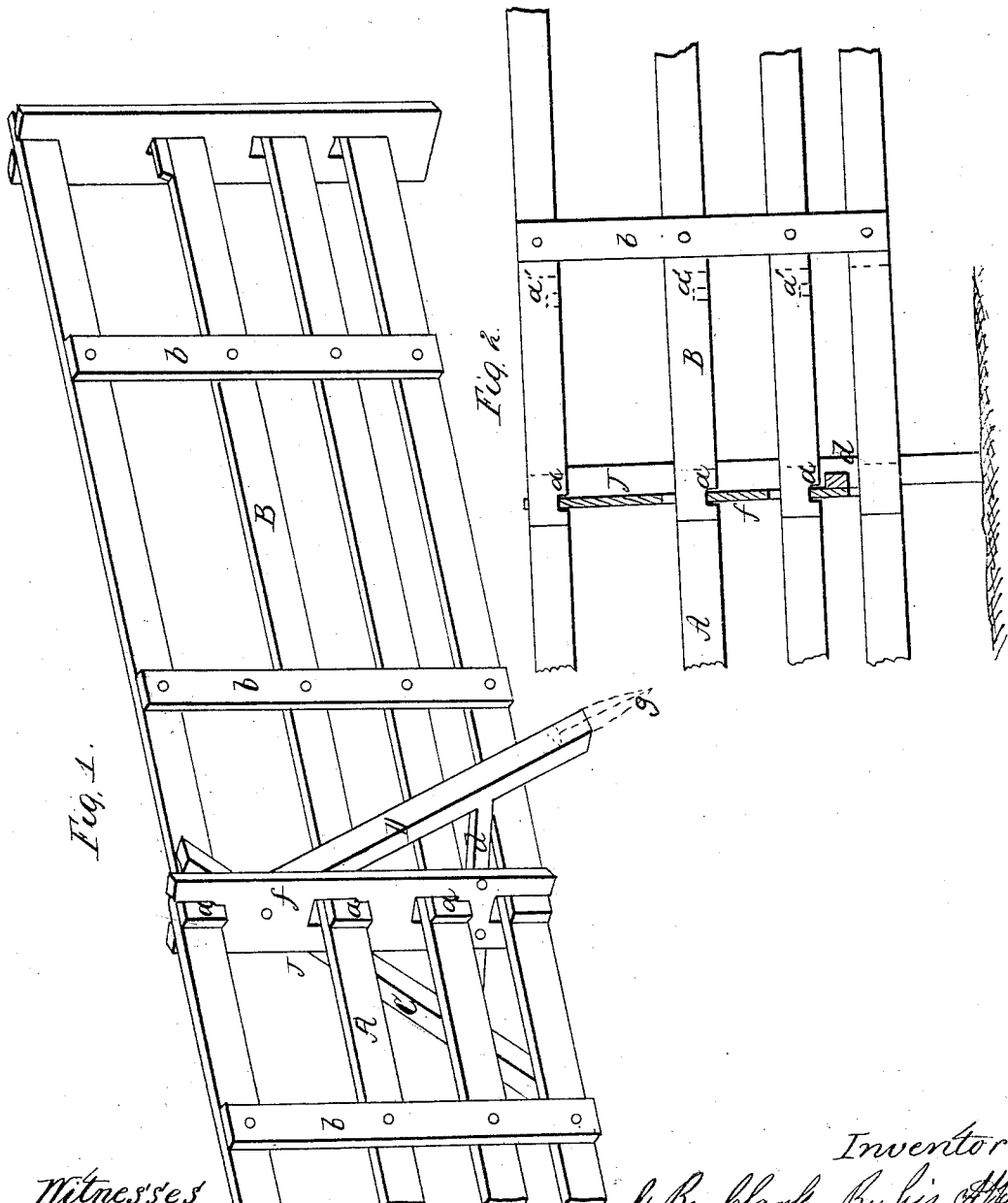

GEORGE R. CLARK, OF LIVONIA, NEW YORK.

Letters Patent No. 62,732, dated March 12, 1867.

IMPROVEMENT IN FENCE.

The Schedule referred to in these Letters Patent and making part of the same.

TO ALL WHOM IT MAY CONCERN:

Be it known that I, GEO. R. CLARK, of Livonia, in the county of Livingston, and State of New York, have invented certain new and useful "Improvements in the Construction of Portable Fences;" and I do hereby declare that the following is a full, clear, and exact description thereof, reference being had to the accompanying drawings, making part of this specification, in which—

Figure 1 is a perspective view of my invention.

Figure 2 is a side elevation of the same, except the supporting-jack or brace J, which is shown in section.

Like letters indicate corresponding parts in both figures.

This invention relates to that class called "portable" fences; and its nature consists in providing a supporting-jack, composed of two diagonal braces crossing each other near the top, and connected together near the lower end by a cross-tie or bar, the sections of the fence being supported in position by being securely locked to them by means of the notches in the ends of the boards.

To enable others to make and use my invention, I will describe its construction and operation.

I make the sections A and B of any desired length or height, and arrange the several battens, $b$, about as shown in the drawings. There may be one, two, or more battens placed intermediately between the ends of the lengths or sections. The supporting-jacks J, for the joints, may be formed, as shown in fig. 1, by framing the two diagonal or oblique braces C and D together at or near the top, and connecting them at the lower end by a suitable tie, $d$, which may be framed into the side of the braces, or it may be simply nailed to them. The upright bar $f$ is nailed to the braces and to the cross-bar, and is provided with suitable mortises to receive the contiguous ends of the two panels or sections A and B. Or there may be a light strip or bar nailed to the braces and cross-bar at proper distances apart to just receive the two thicknesses of the panels between them. Or, as a substitute for the vertical bar or bars $f$, the cross-bar may be made wider than the space between the two lower boards of each panel, and have a notch cut on the upper and lower sides, to receive the boards, and thereby, it is thought, constitute a sufficient lateral support. The notches $a$ in the panels or sections are designed to secure the latter in position longitudinally, as will be understood from the drawings. The battens $b$ may be attached close to the ends of the rails or boards, or placed as shown. The object of the latter arrangement is to permit a length or panel, after being raised out of the notches, to be slid back, as indicated by the dotted lines at $a'$, fig. 2, so as to afford an opening at the other end of the section moved for the passage of stock, &c. A panel thus made, after being released at one end, may be withdrawn entirely when desired. This fence may be more permanently fixed to the ground by driving a stake into the earth over the foot of the braces C and D, as indicated by the dotted lines $g$, in fig. 1. These jacks might be used on embankment fences or on stone walls, and topped out with only one or two boards in height.

What I claim as my invention, and desire to secure by Letters Patent, is—

The relative arrangement of the joint braces or jacks J and the sections or lengths B and A, when the parts are constructed and connected substantially in the manner and for the purposes herein set forth.

GEO. R. CLARK.

Witnesses:
WM. S. LOUGHBOROUGH,
A. H. BILLINGS.